Figure 1:
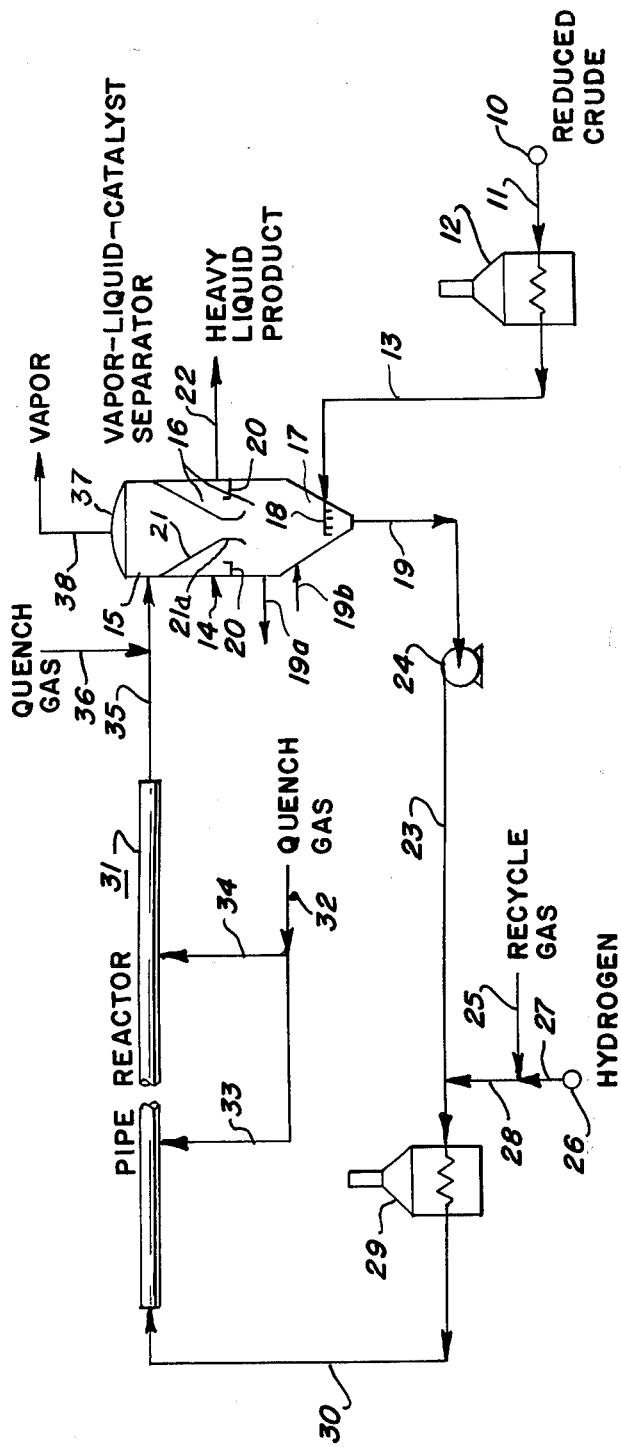

United States Patent [19]
Russum et al.

[11] 3,933,620
[45] Jan. 20, 1976

[54] PROCESS FOR HYDROPROCESSING HEAVY HYDROCARBON FEEDSTOCKS IN A PIPE REACTOR

[75] Inventors: Leonard W. Russum, Highland, Ind.; Gerald B. Hoekstra, South Holland, Ill.

[73] Assignee: Standard Oil Company, Chicago, Ill.

[22] Filed: Aug. 16, 1973

[21] Appl. No.: 388,802

[52] U.S. Cl. .............................................. 208/108
[51] Int. Cl.² ........................................ C10G 13/00
[58] Field of Search .......... 208/108, 109, 110, 112, 208/157, 161, 132

[56] References Cited
UNITED STATES PATENTS

| | | | |
|---|---|---|---|
| 2,944,961 | 7/1960 | McAfee | 208/112 |
| 3,148,135 | 9/1964 | Schlinger et al. | 208/108 |
| 3,207,688 | 9/1965 | van Driesen | 208/108 |
| 3,556,984 | 1/1971 | van Driesen | 208/108 |
| 3,558,474 | 1/1971 | Gleim et al. | 208/108 |
| 3,600,300 | 8/1971 | Steenberg | 208/108 |
| 3,622,495 | 11/1971 | Gatsis et al. | 208/108 |
| 3,622,498 | 11/1971 | Stolfa et al. | 208/108 |

*Primary Examiner*—Delbert E. Gantz
*Assistant Examiner*—James W. Hellwege
*Attorney, Agent, or Firm*—James L. Wilson; Arthur G. Gilkes; William T. McClain

[57] ABSTRACT

Heavy hydrocarbons are hydroprocessed in a pipe reactor and the reactor effluent separated into its vapor, liquid, and catalyst components in a multiple-zone vapor-liquid-catalyst separator. The pipe reactor may have one or more sections and the vapor-liquid-catalyst separator may be employed for intermediate separation.

6 Claims, 3 Drawing Figures

PROCESS FOR HYDROPROCESSING HEAVY HYDROCARBON FEEDSTOCKS IN A PIPE REACTOR

BACKGROUND OF THE INVENTION

This invention relates to the hydroprocessing of heavy hydrocarbon feedstocks, such as heavy gas oils, reduced crudes, and hydrocarbon residua. More particularly, it relates to a novel process for the hydroprocessing of heavy hydrocarbon feedstocks, which process employs a pipe reactor. The pipe reactor may be present in one or more sections or stages.

Today there are various processes employing numerous refining techniques which are used by petroleum refiners to upgrade the petroleum fractions obtained from the petroleum crudes. These processes, such as isomerization, reforming, hydrocracking, and alkylation are well-known in the art and may be used successfully to convert various hydrocarbon fractions into useful products. However, such processes do not convert effectively the higher-boiling feedstocks and fractions into sufficient quantities of usable products, such as motor fuels and heating fuels. Among these higher-boiling hydrocarbons are the heavy gas oils, lubricating oils, and hydrocarbon residua. Such fractions, in particular, hydrocarbon residua, have not been exploited fully by the refiner. Attempts to refine these heavy materials have shown, for the most part, that the processing must be done at such high severities that such processing is unattractive. These refractory materials give relatively low yields of usable products.

Accordingly, a primary object of the present invention is to provide a process that can be used effectively and efficiently to convert the refractory fractions, such as higher-boiling gas oils and residual hydrocarbons, to more usable products.

In the past, the heavier hydrocarbon fractions, such as hydrocarbon residua, have been hydroprocessed, in general, by one of two methods: (1) a method employing a fixed-bed trickle-phase system, and (2) a method employing an ebullating-bed reactor system. Now there has been developed a process which converts effectively the refractory, higher-boiling petroleum fractions. This process employs a pipe reactor.

SUMMARY OF THE INVENTION

Broadly, in accordance with the present invention, there is provided a process for the hydroprocessing of a heavy petroleum hydrocarbon fraction in a system employing a pipe reactor, which process comprises: heating said hydrocarbon fraction to a temperature of at least 600°F. to obtain a preheated heavy hydrocarbon fraction; introducing said preheated heavy hydrocarbon fraction into the bottom zone of a vapor-liquid-catalyst separator having three zones, a top zone wherein vapor is separated from liquid and catalyst, said vapor, said liquid, and said catalyst having been introduced into said top zone as effluent from said pipe reactor, an intermediate zone wherein said catalyst separates from said liquid, and a bottom zone wherein said preheated heavy hydrocarbon fraction is mixed with catalyst to form a heavy-hydrocarbon-catalyst slurry; withdrawing said heavy-hydrocarbon-catalyst slurry from the bottom of said bottom zone; heating said heavy-hydrocarbon-catalyst slurry to a temperature of at least 700°F. to obtain a heated heavy-hydrocarbon-catalyst slurry; passing said heated heavy-hydrocarbon-catalyst slurry through said pipe reactor in the presence of hydrogen while controlling the temperature in said pipe reactor by a means for temperature control; withdrawing effluent from said pipe reactor and passing said effluent into said top zone of said vapor-liquid-catalyst separator; withdrawing vapor product from said top zone of said vapor-liquid-catalyst separator; withdrawing liquid product from said intermediate zone; and obtaining usable products from said vapor product and said liquid product.

Quench gas may be introduced into the pipe reactor at suitable points along its length as a means for temperature control.

The vapor product being removed from the top zone of the vapor-liquid-catalyst separator may be sent to a reactor containing a fixed bed of hydrotreating catalyst wherein the vapor phase may be hydrotreated to saturate olefins and to provide further desulfurization.

The pipe reactor may comprise one or more sections or stages and the vapor-liquid-catalyst separator may be used for intermediate separation, that is, employed between two sections of the pipe reactor.

BRIEF DESCRIPTIONS OF THE DRAWINGS

Three figures are associated with this specification.

FIG. 1 represents a simplified schematic flow diagram of an embodiment of the process of the present invention, which embodiment employs a onesection pipe reactor.

Figure 2:
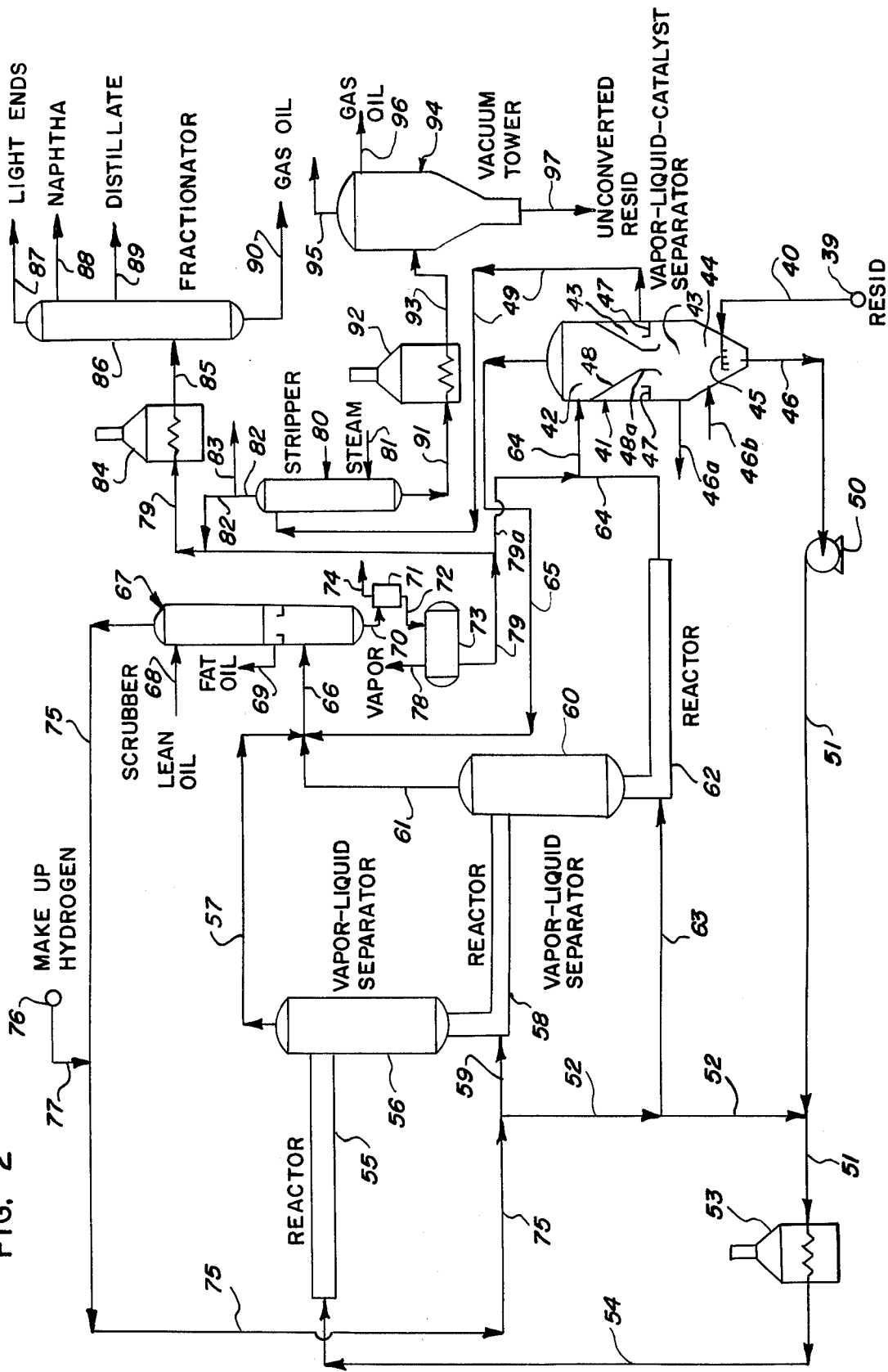

FIG. 2 presents a simplified schematic flow diagram of another embodiment of the process of the present invention wherein the pipe reactor has 3 sections or stages, the first two sections being followed by vapor-liquid separators and the third section being followed by the vapor-liquid-catalyst separator.

Figure 3:
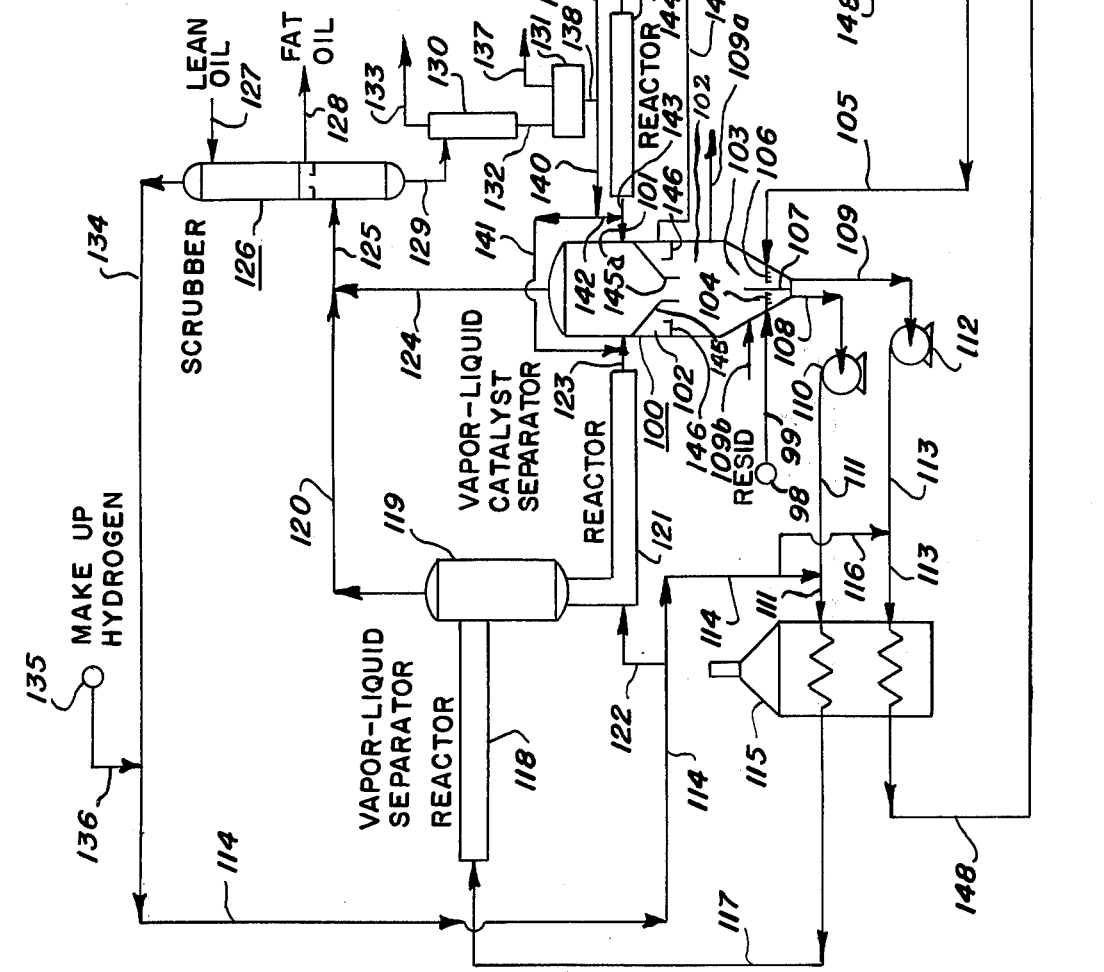

FIG. 3 depicts a simplified schematic flow diagram of a third embodiment of the process of the present invention wherein the pipe reactor has 3 sections and the system employs intermediate separation. The vapor-liquid-catalyst separator is located between the second and third sections of the pipe reactor.

DESCRIPTION AND PREFERRED EMBODIMENTS

The process of the present invention may be used advantageously to hydroprocess heavy hydrocarbon fractions, such as heavy gas oils, lubricating oil, petroleum hydrocarbon residua, hydrocarbons from coal, and hydrocarbons from tar sands. This process employs a pipe reactor, which may have one or more sections or stages, and a multiple-zone vapor-liquid-catalyst separator. Preferably, the pipe reactor should be sufficiently long to provide at least 75 percent desulfurization of the feed. Numerous advantages may be derived from the use of a pipe reactor in the process of the present invention. (1) The pipe reactor operates as a multistage system, whereby it will perform much better for desulfurization than a reaction system employing an ebullating bed. (2) A pipe reactor provides a higher ratio of liquid-volume-to-reactor-volume than does a trickle-phase fixed-bed reactor. Therefore, it should have a higher volumetric cracking efficiency than the trickle-phase fixed-bed reactor. (3) A pipe reactor allows continuous removal of catalyst from the reactor and recirculation of the catalyst to the reactor. Such operation should permit an operating temperature that is higher than the operating temperature employed in a fixed-bed reactor system. (4) Catalyst will be continuously or intermittently withdrawn and replaced in the pipe reactor system. Such withdrawal and addition of catalyst can be changed or modified without unpacking a catalyst bed or shutting down the unit, which would be necessary if the catalyst were present in a fixed bed. (5) The particle size of the catalyst employed is small; consequently, high efficiency of catalyst use with respect to demetalation can be employed. (6) A pipe reactor should be relatively free of slowly progressive plugging problems. In hydroprocessing reduced crude, a fixed-bed catalyst system may encounter such plugging problems. (7) The surface of a pipe reactor is available for cooling. Temperature control is facilitated and the need for high-pressure cooling equipment is minimized. (8) A pipe reactor generally will be more simply fabricated than a straight-side shell reactor, which is conventionally employed for hydrocracking; hence, fabrication for the pipe reactor should, therefore, not be limited to a few major vessel suppliers. As a result, competitive bidding and construction schedules should be facilitated.

Pursuant to the present invention, there is provided a process for the hydroprocessing of a heavy petroleum hydrocarbon fraction in a system employing a pipe reactor, which process comprises: heating said hydrocarbon fraction to a temperature of at least 600°F. to obtain a preheated heavy hydrocarbon fraction; introducing said preheated heavy hydrocarbon fraction into the bottom zone of a vapor-liquid-catalyst separator having three zones, a top zone wherein vapor is separated from liquid and catalyst, said vapor, said liquid, and said catalyst having been introduced into said top zone as effluent from said pipe reactor, an intermediate zone wherein said catalyst separates from said liquid, and a bottom zone wherein said preheated heavy hydrocarbon fraction is introduced into said bottom zone and mixed with said catalyst to form a heavy-hydrocarbon-catalyst slurry; withdrawing said heavy-hydrocarbon-catalyst slurry from the bottom of said bottom zone; heating said heavy-hydrocarbon-catalyst slurry to a temperature of at least 700°F. to obtain a heated heavy-hydrocarbon-catalyst slurry; passing said heated-heavy-hydrocarbon-catalyst slurry through said pipe reactor in the presence of hydrogen while controlling the temperature in said pipe reactor by a means for temperature control; withdrawing effluent from said pipe reactor and passing said effluent into said top zone of said vapor-liquid-catalyst separator; withdrawing vapor product from said top zone of said vapor-liquid-catalyst separator; withdrawing liquid product from said intermediate zone; and obtaining usable products from said vapor product and said liquid product.

In an embodiment of the process of the present invention, the pipe reactor comprises at least two sections, each of said sections, excluding the last section, being followed by a vapor-liquid separator, and said last section being followed by the vapor-liquid-catalyst separator. In such an embodiment, vapor in each vapor-liquid separator is separated from the liquid and catalyst in that particular vapor-liquid separator, the vapor, liquid, and catalyst in that particular vapor-liquid separator having been introduced into that particular vapor-liquid separator as constituents of the effluent from the preceding section of the pipe reactor; the liquid and catalyst in said effluent from the preceding section of pipe reactor are sent to the next succeeding section of said pipe reactor from that particular vapor-liquid separator; and the effluent from said last section of said pipe reactor is withdrawn from said last section and is passed into said top zone of said vapor-liquid-catalyst separator.

In another embodiment of the process of the present invention, there is a system that employs a pipe reactor which has three sections, a first section, a second section, and a third section. In this embodiment, the process comprises: heating the hydrocarbon fraction to a temperature of at least 600°F. to obtain a preheated heavy hydrocarbon fraction; introducing said preheated heavy hydrocarbon fraction into the bottom zone of a vapor-liquid-catalyst separator having three zones, a top zone wherein vapor is separated from liquid and a catalyst, said vapor, said liquid, and said catalyst having been introduced into said top zone as constituents of second effluent from said second section and constituents of third effluent from said third section of said pipe reactor, an intermediate zone wherein said catalyst separates from said liquid, and a bottom zone wherein on one side of a verticle baffle contained therein said preheated heavy hydrocarbon fraction is introduced into said bottom zone and mixed with said catalyst to form a heavy-hydrocarbon-catalyst slurry and on the other side of said baffle a stream of unconverted heavy hydrocarbons, that is, a stream of unconverted hydrocarbons, primarily product from said second section concentrated by fractionation, is introduced into said bottom zone and mixed with said catalyst to form an unconverted-heavy-hydrocarbon-catalyst slurry; withdrawing said heavy-hydrocarbon-catalyst slurry and said unconverted-heavy-hydrocarbon-catalyst slurry from the bottom of said bottom zone; heating said heavy-hydrocarbon-catalyst slurry to a temperature of at least 700°F. to obtain a heated heavy-hydrocarbon-catalyst catalyst slurry; passing said heated-heavy-hydrocarbon-catalyst slurry through said first section of said pipe reactor in the presence of hydrogen while controlling the temperature in said first section by a first means for temperature control; withdrawing a first effluent from said first section and passing said first effluent through a first vapor-liquid separator wherein vapor is separated from the liquid and catalyst in said first effluent; passing said liquid and catalyst in said first effluent through said second section of said pipe reactor in the presence of hydrogen while controlling the temperature in said second section by a second means for temperature control; withdrawing said second effluent from said second section and passing said second effluent into said top zone of said vapor-liquid-catalyst separator; heating said unconverted-heavy-hydrocarbon-catalyst slurry to a temperature of about 700°F. to obtain a heated unconverted-heavy-hydrocarbon-catalyst slurry; passing said heated unconverted-heavy-hydrocarbon-catalyst slurry through said third section of said pipe reactor in the presence of hydrogen while controlling the temperature in said third section by a third means for temperature control; withdrawing said third effluent from said third section and passing said third effluent into said top zone of said vapor-liquid-catalyst separator; withdrawing a vapor product from said top zone of said vapor-liquid-catalyst separator; withdrawing liquid product from said intermediate zone; and obtaining usable products from said vapor product and said liquid product. In this embodiment, the first means, second means, and third means for temperature control each comprises introducing quench gas into the appropriate section of the pipe reactor at suitable points along the length of said appropriate section.

It is to be understood that the method of introducing quench gas into the pipe reactor as a means for temperature control is not the only way of controlling temperatures. The external surface of the pipe reactor itself can be used for this purpose. In such an embodiment, the uninsulated pipe reactor or pipe reactor section would be enclosed in an insulated jacket, through which cooling air is blown. The air which is so heated would be used as preheated air for process or utility furnaces associated with the unit, thereby recovering heat from the reactor. It is conceivable that sufficient heat could be removed from the reactor to provide operation that approaches isothermal operation. In addition, the heat removal pattern could be such to provide controlled gradient operation.

According to the present invention, there is provided a process for the hydroprocessing of heavy hydrocarbon fractions. These heavy hydrocarbon fractions comprise heavy gas oils, lubricating oils, and petroleum hydrocarbon residua.

Hydrocarbon residua are, for the most part, by-products of processes which are primarily used to obtain other petroleum products. The residual fuel oils are examples of such hydrocarbon residua. Commercial residual fuel oils have gravities which may vary between 8.9° and 23.5° API, flash points within the range of about 150° to about 450°F., and pour points within a range of about −55° to about 50°F. Their Conradson carbon residues may fall within a range of about 0.1 to about a value as great as 25 to 30% and their boiling points may fall within a range of about 300° to greater than 1,100°F. Such residual fuel oils have been used generally to supply heat.

The heavier fractions of the various petroleum crudes will contain appreciable amounts of sulfur and nitrogen, as well as certain so-called heavy metals. For example, a vacuum reduced crude may be found to contain as much as 100 parts per million of nickel and vanadium, or more. Metals such as these deleteriously affect the life of any catalyst over which the hydrocarbons containing such metals are being processed. In upgrading the heavier fractions of a petroleum crude, it is desired that a portion of the nitrogen and sulfur be removed from the heavy-gas-oil fraction, which material is sent usually to a catalytic cracker for additional processing.

Hydroprocessing may be used in the upgrading of heavier petroleum fractions to usable petroleum products. It comprises the contacting of the hydrocarbon material that is being processed with a suitable catalyst under suitable conditions in the presence of hydrogen. The outstanding growth of catalytic reforming and the large amounts of hydrogen resulting therefrom have advanced the economic attractiveness of hydroprocessing. In such a process, not only are a great deal of the sulfur and a large percentage of the nitrogen removed from the hydrocarbon material being processed, but also the hydrocarbon material is hydrocracked to yield some usable hydrocarbon products.

Hydrocracking is a general term which is applied to petroleum refining process employing destructive hydrogenation wherein hydrocarbon feedstocks which have relatively high molecular weights are converted to lower-molecular-weight hydrocarbons at elevated temperature and pressure in the presence of a suitable catalyst and a hydrogen-containing gas. Hydrogen is consumed in the conversion of organic nitrogen to ammonia and the conversion of sulfur to hydrogen sulfide, in the splitting of high-molecular-weight compounds into lower-molecular-weight compounds, and in the saturation of olefins and other unsaturated compounds.

Any catalyst that is suitable for the treating of petroleum hydrocarbon residua and other petroleum hydrocarbon fractions may be employed in the process of the present invention. For example, the catalyst may comprise a hydrogenation component and a solid support material. The hydrogenation component may comprise a metal of Group VI-B of the Periodic Table of Elements and/or a metal of Group VIII of the Periodic Table, oxides of such metals, sulfides of such metals, or combinations thereof. The support material may be a solid refractory inorganic oxide. Appropriate Group VI-B metals are molybdenum and tungsten and suitable Group VIII metals are cobalt and nickel, as shown by the Periodic Table found on page 628 of WEBSTER'S SEVENTH NEW COLLEGIATE DICTIONARY, G. & C. Merriam Company, Springfield, Mass., U.S.A. (1965).

An example of a suitable support is a catalytically active alumina. Preferably, the alumina has a surface area of about 150 to about 500 square meters per gram, or higher. It is desirable that such an alumina be in one of the well-known catalytically active crystalline forms, such as gamma-alumina, eta-alumina, or mixtures thereof. Although such alumina may be pure, it may contain also minor amounts of other oxides that are inert under the conditions at which it will be used. Such an alumina can contain a small amount of silica for stability without creating undesirable effects in the process of the present invention. Desirably, the amount of silica is within the range of about 1 to about 10 weight percent. It is essential that the alumina in the catalyst of the present invention has relatively large pore diameters. The average pore diameter of the alumina should be within the range of about 60 to about 200 A, or larger.

An example of a suitable catalyst for the process of the present invention is a catalytic composition comprising cobalt and molybdenum on an inorganic oxide support of a large-pore-diameter alumina having an average pore diameter within the range of about 100 to about 200 angstroms and a surface area within the range of about 150 to about 500 square meters per gram. The combined amounts of the hydrogenation metals are within the range of about 3 to about 35 weight pecent based upon said composition. The molybdenum should be present in an amount within the range of about 4.5 to about 26 weight percent, calculated as molybdenum trioxide and based upon said composition, and the cobalt should be present in an amount within the range of about 1.3 to about 5.2 weight percent, calculated as cobalt oxide and based upon said composition. A typical embodiment of this suitable catalyst comprises 3 weight percent cobalt and 14 weight percent molybdenum, both metals being calculated as the oxides, on a large-pore-diameter alumina.

The catalyst for hydroprocessing heavy gas oils and hydrocarbon residua can be prepared by incorporating the hydrogenation component into the solid support through the use of an aqueous solution of a heat-decomposable compound of the particular metal. In the case of cobalt, a solution of cobalt nitrate, cobalt acetate, cobalt formate, or a solution of such metal compound and a soluble complexing agent, can be used to impregnate the cobalt on the support. In the case of molybdenum, an aqueous solution of ammonium heptamolybdate or a solution of molybdenum trioxide in ethanolamine may be used to impregnate the molybdenum on the support. Following these impregnations, the resulting material is dried and calcined. It is recognized that the catalyst may be prepared by methods other than those discussed hereinabove; therefore, the above preparation methods are presented for purpose of illustration only and are not intended to limit the nature or type of preparation methods.

While a catalyst containing cobalt and molybdenum as hydrogenation metals has been considered hereinabove, it is to be emphasized that this is not the only catalyst that can be employed in the process of the present invention. As pointed out hereinabove, any catalyst that is suitable for the treating of petroleum hydrocarbon fractions may be employed in the process of the present invention. Appropriately, the catalyst may be employed in the shape or spheres or extrudates and advantageously may have a particle size of approximately 30–60 mesh (U.S. Sieve Series). Suitably, the particle size of catalysts employed in the process of the present invention should fall within the range of 0.005 to about 0.125 inch.

The following examples are presented for the purpose of illustration only and are not intended to limit the scope of the present invention. Each of these examples is associated with a figure. Please note that in each of these figures some pieces of auxiliary equipment, such as compressors, heat exchangers, valves, and some pumps, are not shown. Since the need and location of such auxiliary equipment would be recognized easily by those skilled in the art, its omission is appropriate and provides simplification of the drawings.

EXAMPLE 1

An embodiment of the process of the present invention is presented in this example. This embodiment is depicted in FIG. 1 and presents the invention in its broadest aspects.

A heavy hydrocarbon feedstock, such as a reduced crude, passes from source 10 through line 11 into furnace 12, where it is preheated to a temperature of about 700°F. The heated hydrocarbon feedstock passes through line 13 into vapor-liquid-catalyst separator 14. Separator 14 is a multiple-zone separator, having a top zone 15, an intermediate zone 16, and a bottom zone 17. The heated hydrocarbon feedstock passes from line 13 through distribution means 18 into bottom zone 17 of separator 14. In bottom zone 17, which is located in the inverted conical section at the bottom of separator 14, the heated hydrocarbon feedstock replaces reactor-effluent liquid to form a feedstock-catalyst slurry.

The hydrocarbon-feedstock-catalyst slurry formed in bottom zone 17 passes downwardly through zone 17 into line 19. Catalyst may be withdrawn conveniently as an oil slurry from separator 14 by way of line 19a and fresh catalyst may be added via line 19b.

In intermediate zone 16, catalyst separates from reactor-effluent liquid by gravity and descends into bottom zone 17. Reactor-effluent liquid passes between separator baffle 20 and the extension of inverted conical baffle 21, which extension is identified as duct 21a. Top zone 15 is separated from intermediate zone 16 by inverted conical baffle 21. Intermediate zone 16 extends from inverted conical baffle 21 downwardly to approximately the lower end of the vertical sides of vessel 14. Below this is located bottom zone 17. Subsequently, the reactor-effluent liquid passes from zone 16 into line 22 located above baffle 20 and then through line 22 as heavy liquid product to a product recovery system. Such product recovery system would be well-known to those having ordinary skill in the art and, hence, is not shown here.

The hydrocarbon-feedstock-catalyst slurry is pumped from line 19 through line 23 by pump 24. Hydrogen-containing recycle gas, obtained from the product recovery system of the process, not shown, passes through line 25, to be joined by makeup hydrogen source 26 and line 27. The gases mix in line 28 and pass into line 23, where they intermingle and blend with the hydrocarbon-feedstock-catalyst slurry. The resulting blend passes through line 23, furnace 29, and line 30 into pipe reactor 31. Alternatively, the gas stream could be heated in a furnace and the hot gas stream blended with the hydrocarbon-feedstock-catalyst slurry prior to its introduction into the pipe reactor 31. Practically, the reaction starts at the outlet of the furnace or, perhaps, in the furnace. The heat of reaction produced may be controlled by the addition of quench gas at selected points along the length of the pipe reactor 31. For purposes of illustration, quench gas passes from line 32 through lines 33 and 34 into pipe reactor 31. Alternatively, the surface of the pipe reactor could be used for cooling. In such case, breeching and baffling could be used to control forced air flow around the outside of the pipe reactor. The resultant heated air could be employed advantageously for furnace pre-heat.

The pipe reactor 31 should have a pipe length that is sufficient to give the desired conversion and the desired extent of desulfurization and denitrogenation. It is recommended that total pipe volume be adequate to permit a residence time of about 5 minutes to 2 hours. Other operating conditions are: a hydrogen partial pressure of about 300 psia to about 3,000 psia, a temperature of about 600° to about 1,000°F., and an amount of catalyst that could conceivably be as large as that permitted by the carrying capacity of the liquid passing through the pipe reactor.

Reactor effluent passes from pipe reactor 31 through line 35 to vapor-liquid-catalyst separator 14. If needed, reactor effluent may be mixed with quench gas to control the temperature in separator 14. Quench gas may be added via line 36.

The reactor effluent and quench gas, if used, pass from line 35 into top zone 15 of separator 14. As pointed out hereinabove, top zone 15 is separated from intermediate zone 16 by conical-shaped baffle 21. In zone 15, vapor is separated from the liquid and catalyst. Vapor passes from the top 37 of separator 14 by way of line 38 to be sent to a vapor recovery system, not shown. Recycle gas is obtained from the vapor and a portion thereof is sent to line 25. Another portion of the recycle gas may be used as quench gas, if desired.

As an alternative, the vapor in line 38 may be sent to a vapor phase reactor containing one or more fixed beds of a hydrogenation catalyst, such as a catalyst comprising the oxides of cobalt and molybdenum on alumina, for hydrotreating to provide olefin saturation and further desulfurization. In any event, the vapor would eventually be separated from the liquid and returned to the process system as recycle gas.

In intermediate zone 16 of separator 14, the catalyst separates from the heavy liquid product, which product is withdrawn from the annular space in intermediate zone 16 between conical baffle 21, separator baffle 20, and the walls of vessel 14 and is removed as heavy liquid product via line 22, as noted hereinabove.

EXAMPLE II

FIG. 2 presents another embodiment of the process of the present invention wherein the pipe reactor is made up of three sections, each section being separated from the preceding section by a vapor-liquid separator. The vapor-liquid separator permits a greater fraction of the pipe reactor to contain catalyst slurry.

A petroleum hydrocarbon residuum is obtained from source 39, is heated to a temperature of about 700°F. by means not shown, and is passed through line 40 into a multiple-zone vapor-liquid-catalyst separator 41. This residuum is a vacuum residuum and has the properties shown in Table I hereinbelow.

TABLE I

| Properties of Vacuum Residuum | |
|---|---|
| Gravity, °API | 5.8 |
| Sulfur, wt.% | 4.02 |
| Nitrogen, wt.% | 0.53 |
| Hydrogen, wt.% | 9.95 |
| Ramsbottom Carbon, wt.% | 21.4 |
| Hot heptane insolubles, wt.% | 19.2 |
| Viscosity, SSF at 210°F. | 2039 |
| SSF at 275°F. | 153 |
| Metal, ppm | |
| nickel | 45 |
| vanadium | 138 |
| Composition, volume % | |
| 650° – 1,000°F. | 5.0 |
| 1,000+°F. | 95.0 |
| Composition, weight % | |
| 650° – 1,000°F. | 3.9 |
| 1,000+°F. | 96.1 |

The residuum is treated at the rate of 10,000 barrels per stream day (BSD). The vapor-liquid-catalyst separator 41 comprises a top zone 42, an intermediate zone 43, and a bottom zone 44. The heated residuum passes from line 40 through distribution means 45 into bottom zone 44 of vapor-liquid-catalyst separator 41. In bottom zone 44, the lower inverted conical section, the heated residuum replaces reactor-effluent liquid to form a residuum-catalyst slurry.

The resultant residuum-catalyst slurry passes downwardly through zone 44 into line 46. Spent catalyst, present as an oil slurry, is withdrawn from the system via line 46a and fresh catalyst is added via line 46b. The replaced reactor-effluent liquid, which separates from the catalyst in intermediate zone 43 by gravity as the liquid-catalyst slurry descends in intermediate zone 43, passes between separator baffle 47 and the extension of inverted conical baffle 48, which extension is identified as duct 48a. Subsequently, the reactor-liquid effluent is withdrawn from intermediate zone 43 as heavy liquid product by way of line 49 at the rate of 5,320 BSD.

Top zone 42 is separated from intermediate zone 43 by inverted conical baffle 48. Intermediate zone 43 extends from inverted conical baffle 48 downwardly to approximately the lower end of the vertical walls of separator 41. Below this is located bottom zone 44.

The residuum-catalyst slurry, at a temperature of 700°F., is pumped at the rate of 12,500 BSD by pump 50 from line 46 through line 51. Hydrogen-containing recycle gas is introduced into line 51 by way of line 52 and is mixed with the residuum-catalyst slurry. The resultant residuum-catalyst-gas blend is heated in furnace 53 to a temperature of about 820°F. and the heated mixture passes through line 54 into the first section 55 of the pipe reactor. First section 55 has an inside diameter of 10 inches and a length of 1,350 feet. The pressure in this first section 55 decreases from 2,000 psia at its inlet to 1,990 psia at its outlet. The temperature in first section 55 is maintained at 820°F. As pointed out hereinabove, for all practical purposes, the reaction zone begins at the outlet of the furnace or in the furnace itself.

The effluent from first section 55 passes into vapor-liquid separator 56, which is operated at a temperature of 820°F. and a pressure of 1,990 psia. Vapor is separated from the liquid and catalyst and passes from vapor-liquid separator 56 via line 57 at the rate of 17,200 standard cubic feet per minute (SCFM). The liquid-catalyst mixture passes from vapor-liquid separator 56 into second section 58 of the pipe reactor. Second section 58 has an inside diameter of 10 inches and a length of 2,450 feet. Hydrogen-containing recycle gas is introduced into second section 58 via line 59. Second-section 58 is operated at a temperature of 820°F. and a pressure of 1,990 psia at its inlet and a pressure of 1,980 psia at its outlet.

The effluent from second section 58 passes into vapor-liquid separator 60. Separator 60 is operated at a temperature of 820°F. and a pressure of 1,980 psia. Vapor is separated from the liquid and catalyst and passes from vapor-liquid separator 60 by way of line 61 at the rate of 15,430 SCFM and the oil-catalyst slurry passes from vapor-liquid separator 60 into third section 62 of the pipe reactor. The third section 62 has an inside diameter of 7 inches and a length of 5,610 feet. Hydrogen-containing recycle gas is introduced into third section 62 of the pipe reactor by way of line 63. Third section 62 is operated at a temperature of 820°F. and a pressure of 1,980 psia at its inlet and a pressure of 1,970 psia at its outlet.

As explained hereinabove, suitable means for temperature control may be employed at each section of the pipe reactor.

The effluent from the third section 62, comprising a vapor-liquid-catalyst slurry, passes through line 64 into the top zone 42 of vapor-liquid-catalyst separator 41. The effluent from third section 62 is combined with a portion of cool liquid from scrubber 67 discussed hereinbelow. This cooler liquid is used at the rate of 2,700 BSD and has a temperature of about 100°F. Quench gas could also be used as a cooling means. Of course, cooling is also accomplished by heat-exchange means, not shown in the simplified figure. Wash water is added to the stream line 66. Vapor is separated from the liquid and catalyst in top zone 42 and is withdrawn from the top of vapor-liquid-catalyst separator 41 by way of line 65 at a temperature of about 700°F., a pressure of 1,970 psia, and a rate of 19,250 SCFM. This vapor is combined with the vapor streams in lines 57 and 61, withdrawn respectively from vapor-liquid separators 56 and 60, and the combined vapor is passed through line 66 into recycle-gas scrubber 67. Recycle-gas scrubber 67 is operated at a temperature of 120°F. and a pressure of 1,915 psia. Lean oil is introduced into scrubber 67 by way of line 68 at a rate of 2,860 BSD and fat oil is withdrawn via line 69 and sent to appropriate recovery equipment. Liquid product is removed from the bottom of scrubber 67 by way of line 70 and caolescer 71 and is sent to a vapor-liquid separator 73 via line 72. About 686 BSD of water are released at a temperature of about 120°F. from coalescer 71 by way of line 74. Vapor-liquid separator 73 is operated at a temperature of 100°F. and a pressure of 214 psia.

Hydrogen-containing gas is withdrawn from recycle-gas scrubber 67 by way of line 75. This hydrogen-containing gas is compressed to a pressure of 2,075 psia and a temperature of 140°F. and is passed through line 75 at a rate of 43,400 SCFM. Makeup hydrogen from source 76, at a temperature of 100°F. and a pressure of about 265 psia, is compressed to a pressure of about 2,075 psia and a temperature of 300°F. and is passed through line 77 at a rate of 13,500 SCFM, to be combined with the hydrogen-containing gas in line 75. This gas mixture is then passed through line 75, to be divided into several streams, which are subsequently passed through lines 59, 52, and 63 and are introduced into the second section 58 of the pipe reactor, first section 55, and third section 62, respectively, as discussed hereinabove.

Vapor is removed from vapor-liquid separator 73 by way of line 78 and is sent to suitable vapor recovery equipment, not shown in FIG. 2. The flow rate of vapor is 3,700 SCFM. Liquid is removed from vapor-liquid separator 73 via line 79, is heated by appropriate means to a temperature of 400°F., and is sent at a rate of 4,280 BSD to be fractionated into useful product streams. As mentioned hereinabove, another portion of this liquid is sent via line 79a to be combined with effluent from the third section 62 of the pipe reactor in line 64.

Heavy liquid product from vapor-liquid-catalyst separator 41 passes through line 49 at the rate of 5,320 BSD and at a temperature of about 700°F. into the top of stripper 80. Stream is introduced into the bottom of stripper 80 via line 81 at the rate of about 1,500 pounds per hour. Lighter hydrocarbons are withdrawn from the top of stripper 80 by way of line 82. Lights ends are separated from this stream by means not shown and are sent by way of line 83 at a rate of 620 SCFM to appropriate vapor recovery equipment, not shown in FIG. 2. The remainder of this stream is sent by line 82 to be combined with the liquid from vapor-liquid separator 73 in line 79.

The combined liquid in line 79 is heated in furnace 84 to a temperature of 550°F. and is passed through line 85 into fractionator 86. Light ends, naphtha, distillate, and gas oil are withdrawn from fractionator 86 via lines 87, 88, 89, and 90, respectively, at the following respective rates, 630 SCFM, 3,560 BSD, 3,360 BSD, and 350 BSD.

The heavier hydrocarbons in stripper 80 are withdrawn from the bottom of stripper 80 by way of line 91 at a temperature of 640°F. and at a rate of 3,760 BSD and are sent to furnace 92 and then through line 93 into vacuum tower 94. Vacuum tower 94 is operated at a temperature of 750°F. A pressure of 70 millimeters of mercury is employed in the flash zone of vacuum tower 94. Inerts, estimated to have a molecular weight of 30, are removed by line 95 at a rate of 200 pounds per hour and gas oil is withdrawn from vacuum tower 94 by way of line 96 at a temperature of 150°F. and at a rate of 2,250 BSD. Unconverted resid is withdrawn from the bottom of vacuum tower 94 by way of line 97 at a temperature of 175°F. and at a rate of 1,420 BSD.

In this embodiment, 85 volume percent of the 1,000°F.-plus material in the resid is converted to lower boiling products. Conversion in the first section 55 of the pipe reactor is 40 volume percent; in the second section 58, 30 volume percent; and in the third section 62, 15 volume percent. About 40 percent of the pipe volume contains catalyst-liquid slurry.

EXAMPLE III

FIG. 3 presents still another embodiment of the process of the present invention wherein the first two sections of the pipe reactor are separated from the third section of the pipe reactor by the vapor-liquid-catalyst separator. This embodiment of the process of the present invention may be identified as that embodiment having intermediate product separation. This embodiment permits a reduction in the recracking of products, which would otherwise pass through the third section of pipe reactor, and a reduction in the length of the third section of the pipe reactor by concentrating the unconverted residuum in the feed to that section. Moreover, it permits higher catalyst-to-oil ratios throughout the pipe reactor. The amount of catalyst included is limited by the amount of liquid phase at the outlet of the pipe reactor. The amount of liquid phase decreases through the pipe reactor because conversion takes place.

The same petroleum hydrocarbon residuum that is employed in Example II is obtained from source 98 and is passed by way of line 99 into the bottom zone of a multiple-zone vapor-liquid-catalyst separator 100. This residuum is treated at the rate of 10,000 BSD. The vapor-liquid-catalyst separator 100 is composed of a top zone 101, an intermediate zone 102, and a bottom zone 103. The residuum, heated to a temperature of about 700°F. by means not shown, passes from line 99 through distribution means 104 into bottom zone 103 of the vapor-liquid-catalyst separator 100. Please note that the bottom zone 103 is divided into two sides. In the one side, the resid is introduced into the separator 100 by way of distributor 104. In the other side of the bottom zone 103, recycled unconverted resid is introduced into bottom zone 103 by way of line 105 and distributor means 106. The bottom zone 103 is separated by baffle 107. In bottom zone 103, either the heated residuum replaces reactor-effluent liquid to form a residuum-catalyst slurry on one side of baffle 107 or the hot recycled unconverted residuum replaces reactor-effluent liquid to form an unconverted-residuum-catalyst slurry on the other side of baffle 107. The resultant residuum-catalyst slurry is withdrawn from bottom zone 103 via line 108 and the resultant unconverted-residuum-catalyst slurry is withdrawn from bottom zone 103 by way of line 109. Spent catalyst, present as an oil slurry, is withdrawn from the system via line 109a and fresh catalyst is added via line 109b.

The residuum-catalyst slurry in line 108 is pumped by pump 110 through line 111 at the rate of 14,600 BSD. In a like manner, the unconverted-residuum-catalyst slurry in line 109 is pumped by pump 112 through line 113 at the rate of 5,280 BSD. Hydrogen-containing gas is introduced into line 111 by way of line 114 and the resultant gas-residuum-catalyst mixture is passed through line 111 into furnace 115. In a like manner, hydrogen-containing gas is passed through line 116 into line 113 and the resultant gas-catalyst-unconverted-residuum mixture is passed through line 113 into furnace 115.

The resultant gas-residuum-catalyst mixture is heated in furnace 115 to a temperature of about 820°F. and the heated mixture is then passed through line 117 into the first section 118 of the pipe reactor. First section 118 of the pipe reactor has an inside diameter of 10 inches and a length of 1,660 feet. The pressure in this first section 118 decreases from 2,000 psia at its inlet to 1,990 psia at its outlet. The temperature in the first section 118 is maintained at 820°F. For all practical purposes, the reaction begins at the outlet of furnace 115 or in the furnace itself.

The effluent from first section 118 passes into vapor-liquid separator 119, which is operated at a temperature of 820°F. and at a pressure of 1,990 psia. Vapor is separated from the liquid and catalyst and passes from vapor-liquid separator 119 via line 120 at the rate of 17,200 SCFM. The liquid-catalyst mixture passes from vapor-liquid separator 119 into second section 121 of the pipe reactor. Second section 121 has an inside diameter of 10 inches and a length of 3,090 feet. Hydrogen-containing recycle gas is introduced into second section 121 via line 122. Second-section 121 is operated at a temperature of 820°F. and a pressure of 1,990 psia at its inlet and a pressure of 1,980 psia at its outlet.

The effluent from second section 121 passes through line 123 into the top zone 101 of vapor-liquid-catalyst separator 100. Quench liquid is introduced into line 123 by way of line 141. Vapor is separated from the liquid and catalyst in top zone 101 and is withdrawn from the top of vapor-liquid-catalyst separator 100 by way of line 124 at a temperature of about 700°F., a pressure of 1,980 psia, and a rate of 35,700 SCFM. This vapor is combined with the vapor stream in line 120 that is withdrawn from vapor-liquid separator 119 and the combined vapor is passed through line 125 into recycle-gas scrubber 126. The combined vapor stream is cooled by heat-exchange means, not shown, and water washing, not shown, as it passes through line 125.

Recycle-gas scrubber 126 is operated at a temperature of 120°F. and a pressure of 1,915 psia. Lean oil is introduced into scrubber 126 by way of line 127 at a rate of 2,860 BSD and fat oil is withdrawn via line 128 and sent to appropriate recovery equipment, not shown. Liquid product is removed from the bottom of scrubber 126 by way of line 129 and coalescer 130 and is sent to a vapor-liquid separator 131 by way of line 132. About 686 BSD of water are released at a temperature of about 120°F. from coalescer 130 by way of line 133. Vapor-liquid separator 131 is operated at a temperature of 100°F. and a pressure of 215 psia.

Hydrogen-containing gas is withdrawn from recycle-gas scrubber 126 by way of line 134. This hydrogen-containing gas is compressed to a pressure of 2,075 psia and a temperature of 140°F. and is passed through line 134 at the rate of 43,400 SCFM. Makeup hydrogen from source 135, at a temperature of 100°F. and a pressure of about 265 psia, is compressed to a pressure of about 2,075 psia and a temperature of 300°F. and is passed through line 136 at a rate of 13,100 SCFM, to be combined with the hydrogen-containing gas in line 134. This gas mixture is then passed through line 134 and line 114, to be divided into several streams, one of which is passed through line 122 into the second section 121 of the pipe reactor, one of which is introduced into the catalyst-residuum slurry in line 111 by way of line 114, and another of which is passed through line 116 into the unconverted-residuum-catalyst slurry in line 113, as mentioned hereinabove.

Vapor is removed from vapor-liquid separator 131 by way of line 137 and is sent to suitable vapor recovery equipment, not shown in FIG. 3. The flow rate of the vapor is 3,300 SCFM. Liquid is removed from vapor-liquid separator 131 by way of line 138 and is divided into two streams, one being sent through line 139 and the other being sent through line 140. The liquid passing through line 139 is heated by appropriate means to a temperature of 420°F. and is passed at a rate of 4,100 BSD to be fractionated into useful product streams. The liquid passing through line 140 is passed at the rate of 4,580 BSD. This liquid stream in line 140 is then divided into two streams, one of which passes through line 141 into line 123, which contains effluent from second section 121 of the pipe reactor, as discussed hereinabove. The other liquid stream from the liquid in line 140 passes through line 142 into line 143, which contains effluent from the third section 144 of the pipe reactor, as discussed hereinafter.

The vapor-liquid-catalyst mixtures in lines 143 and 123 are passed into the top zone 101 of vapor-liquid-catalyst separator 100. As pointed out hereinabove, vapor is separated from the mixture and is withdrawn from separator 100 by way of line 124. The liquid-catalyst slurry descends through duct 145a, an extension of inverted conical baffle 145, into intermediate zone 102 of vapor-liquid-catalyst separator 100, where the catalyst separates from the liquid by gravity and passes into bottom zone 103.

Top zone 101 is separated from intermediate zone 102 by inverted conical baffle 145. Intermediate zone 102 extends from inverted conical baffle 145 downwardly to approximately the lower end of the vertical walls of separator 100. Below this is located bottom zone 103.

In bottom zone 103, the catalyst meets the heated resid from distribution means 104 and the unconverted residuum from distribution means 106. The liquid product is withdrawn from the annular space in intermediate zone 102 between conical baffle 145, separator baffle 146, and the walls of separator 100 by way of line 147 as heavy liquid product.

The heated hydrogen-containing-gas-unconverted-residuum-catalyst mixture in line 113 is sent through furnace 115 and line 148 into third-section 144 of the pipe reactor. Third section 144 of the pipe reactor has an inside diameter of 7 inches and a length of 3,730 feet. This third section 144 is operated at a temperature of 820°F. and a pressure of 1,990 psia at its inlet and a pressure of 1,980 at its outlet.

Although not shown, suitable temperature-control means may be employed at each section of the pipe reactor.

Heavy liquid product from vapor-liquid-catalyst separator 100 passes through line 147 at the rate of 8,700 BSD and at a temperature of about 700°F. into the top of stripper 149. Steam is introduced into the bottom of stripper 149 via line 150 at the rate of about 2,900 pounds per hour. Lighter hydrocarbons are withdrawn from the top of stripper 149 by way of line 151. Light ends are separated from this stream in appropriate equipment, not shown, and are sent by way of line 152 at a rate of about 620 SCFM to appropriate vapor recovery equipment, not shown in FIG. 3. The remainder of this stream is sent by line 153 to be combined with the liquid from vapor-liquid separator 131, which liquid is passing through line 139.

The combined liquid from lines 139 and 153 is sent through line 154 to furnace 155 and is heated in furnace 155 to a temperature of 550°F. The heated liquid is then passed through line 156 into fractionator 157. Light ends, naphtha, distillate, and gas oil are withdrawn from fractionator 157 via lines 158, 159, 160, and 161, respectively, at the following respective rates: 630 SCFM, 3,490 BSD, 3,250 BSD, and 350 BSD.

The heavier hydrocarbons in stripper 149 are withdrawn from the bottom of stripper 149 by way of line 162 at a temperature of 640°F. and at a rate of 7,050 BSD and sent to furnace 163 and then through line 164 into vacuum tower 165. Vacuum tower 165 is operated at a temperature of 750°F. and a pressure of 25 millimeters of mercury in the flash zone. Inerts, estimated to have a molecular weight of 30, are removed at the rate of 280 pounds per hour from vacuum tower 165 by line 166 and gas oil is withdrawn from vacuum tower 165 by way of line 167 at a temperature of 150°F. and at a rate of 2,410 BSD. Unconverted residuum is withdrawn from the bottom of vacuum tower 165 by way of line 168. This stream of unconverted residuum is then divided into two streams. One stream of unconverted residuum is withdrawn from the system at a temperature of 175°F. and at a rate of 1,420 BSD. This stream is withdrawn by way of line 169. The other stream of unconverted residuum is passed through line 170 to be pumped by pump 171 into line 105 as recycled hydrocarbons. This recycled resid stream is at a temperature of 750°F. and is moved at the rate of 3,220 BSD.

In this embodiment of the process of the present invention, 85 volume percent of the 1,000°F.—plus material in the resid is converted to higher boiling products, just as was done in the previous embodiment. Coversion in the first section 118 of the pipe reactor is 40 volume percent; in the second section 121, 30 volume percent; and in the third section 144, 15 volume percent. However, in this embodiment, the gas oil being fed to the third section 144 and the volume of the third section 144 are reduced. Moreover, this intermediate-separation technique reduces the amount of cracking of the product gas oil and allows a higher catalyst-to-oil ratio. A comparison of catalyst-to-oil ratios obtained by once-through operation with those obtained by intermediate-separation techniques is presented in Table II.

said bottom zone; heating said heavy-hydrocarbon-catalyst slurry to a temperature of at least 700°F. to obtain a heated heavy-hydrocarbon-catalyst slurry; passing said heated heavy-hydrocarbon-catalyst slurry through said pipe reactor in the presence of hydrogen under conditions suitable for the hydroprocessing of heavy petroleum hydrocarbons, including a temperature of about 600° to about 1,000°F. and a hydrogen partial pressure of about 300 psia to about 3,000 psia, while controlling the temperature in said pipe reactor by a means for temperature control; withdrawing effluent from said pipe reactor and passing said effluent into said top zone of said vapor-liquid-catalyst separator; withdrawing vapor product from said top zone of said vapor-liquid-catalyst separator; withdrawing liquid product from said intermediate zone; and obtaining usable products from said vapor product and said liquid product, said catalyst being suitable for the hydroprocessing of heavy petroleum hydrocarbons.

2. The process of claim 1 wherein said means for temperature control comprises introducing quench gas into said pipe reactor at suitable points along the length of said pipe reactor.

3. The process of claim 1 wherein said pipe reactor comprises at least two sections, each of said sections, excluding the last section, being followed by a vapor-liquid separator and said last section being followed by said vapor-liquid-catalyst separator; and wherein in each vapor-liquid separator vapor is separated from the liquid and catalyst in that particular vapor-liquid separator, the vapor, liquid, and catalyst in that particular vapor-liquid separator having been introduced into that particular vapor-liquid separator as constituents of the effluent from the preceding section of said pipe reactor; the liquid and catalyst in said effluent from the preceding section of pipe reactor are sent to the next succeeding section of said pipe reactor from that particular vapor-liquid separator; and the effluent from said last section of said pipe reactor is withdrawn from said last section and is passed into said top zone of said vapor-liquid-catalyst separator.

TABLE II

CATALYST-TO-OIL WEIGHT RATIOS FOR PIPE REACTORS HAVING THREE SECTIONS

| OPERATION | SECTION I | | | SECTION II | | | SECTION III | | |
|---|---|---|---|---|---|---|---|---|---|
| | Inlet | Outlet | Avg. | Inlet | Outlet | Avg. | Inlet | Outlet | Avg. |
| Once-Through | 0.20 | 0.25 | 0.23 | 0.27 | 0.37 | 0.32 | 0.42 | 0.60 | 0.51 |
| Intermediate Separation | 0.34 | 0.42 | 0.38 | 0.45 | 0.60 | 0.53 | 0.40 | 0.60 | 0.50 |

What is claimed is:

1. A process for the hydroprocessing of a heavy petroleum hydrocarbon fraction in a system employing a pipe reactor, which process comprises: heating said hydrocarbon fraction to a temperature of at least 600°F. to obtain a preheated heavy hydrocarbon fraction; introducing said preheated heavy hydrocarbon fraction into the bottom zone of a vapor-liquid-catalyst separator having three zones, a top zone wherein vapor is separated from liquid and catalyst, said vapor, said liquid, and said catalyst having been introduced into said top zone as effluent from said pipe reactor, an intermediate zone wherein said catalyst separates from said liquid, and a bottom zone wherein said preheated heavy hydrocarbon fraction is introduced into said bottom zone and mixed with said catalyst to form a heavy-hydrocarbon-catalyst slurry; withdrawing said heavy-hydrocarbon-catalyst slurry from the bottom of 4. The process of claim 3 wherein said means for temperature control comprises introducing quench gas into said pipe reactor at suitable points along the length of said pipe reactor.

5. A process for the hydroprocessing of a heavy hydrocarbon feedstock in a system employing a first pipe reactor having two sections, a first section and a second section, and a second pipe reactor having one section, which process comprises: heating said hydrocarbon feedstock to a temperature of at least 600°F. to obtain a preheated heavy hydrocarbon fraction; introducing said preheated heavy hydrocarbon fraction into the bottom zone of a vapor-liquid-catalyst separator having three zones, a top zone wherein vapor is separated from liquid and a catalyst, said vapor, said liquid, and said catalyst having been introduced into said top zone as constituents of second effluent from said second section of said first pipe reactor and constituents of third effluent from said second pipe reactor, an intermediate zone wherein said catalyst separates from said liquid, and a bottom zone wherein on one side of a verticle baffle contained therein said preheated heavy hydrocarbon fraction is introduced into said bottom zone and mixed with said catalyst to form a heavy-hydrocarbon-catalyst slurry and on the other side of said baffle a stream of recycled unconverted heavy hydrocarbons is introduced into said bottom zone and mixed with said catalyst to form an unconverted-heavy-hydrocarbon-catalyst slurry; withdrawing said heavy-hydrocarbon-catalyst slurry and said unconverted-heavy-hydrocarbon-catalyst slurry from the bottom of said bottom zone; heating said heavy-hydrocarbon-catalyst slurry to a temperature of at least 700°F. to obtain a heated heavy-hydrocarbon-catalyst slurry; passing said heated heavy-hydrocarbon-catalyst slurry through said first section of said first pipe reactor in the presence of hydrogen while controlling the temperature in said first section of said first pipe reactor by a first means for temperature control; withdrawing a first effluent from said first section of said first pipe reactor and passing said first effluent through a first vapor-liquid separator wherein vapor is separated from the liquid and catalyst in said first effluent; passing said liquid and catalyst in said first effluent through said second section of said first pipe reactor in the presence of hydrogen while controlling the temperature in said second section of said first pipe reactor by a second means for temperature control; withdrawing said second effluent from said second section of said first pipe reactor and passing said second effluent into said top zone of said vapor-liquid-catalyst separator; heating said unconverted-heavy-hydrocarbon-catalyst slurry to a temperature of about 700°F. to obtain a heated unconverted-heavy-hydrocarbon-catalyst slurry; passing said heated unconverted-heavy-hydrocarbon-catalyst slurry through said second pipe reactor in the presence of hydrogen while controlling the temperature in said second pipe reactor by a third means for temperature control; withdrawing said third effluent from said second pipe reactor and passing said third effluent into said top zone of said vapor-liquid-catalyst separator; withdrawing a vapor product from said top zone of said vapor-liquid-catalyst separator; withdrawing liquid product from said intermediate zone; and obtaining usable products from said vapor product and said liquid product, said first pipe reactor and said second pipe reactor being maintained at conditions that are suitable for the hydroprocessing of heavy petroleum hydrocarbons, including a temperature of about 600°F. to about 1,000°F. and a hydrogen partial pressure of about 300 psia to about 3,000 psia, and said catalyst being suitable for the hydroprocessing of heavy petroleum hydrocarbons.

6. The process of claim 4 wherein said first means, said second means, and said third means for temperature control each comprises introducing quench gas into the appropriate section of said first pipe reactor and said second pipe reactor at suitable points along the length of said appropriate section.

* * * * *

UNITED STATES PATENT OFFICE
CERTIFICATE OF CORRECTION

PATENT NO. : 3,933,620
DATED : January 20, 1976
INVENTOR(S) : Leonard W. Russum and Gerald B. Hoekstra It is certified that error appears in the above-identified patent and that said Letters Patent are hereby corrected as shown below:

Column 4, line 34, "heavy-hydrocarbon-catalyst catalyst slurry;" should be -- heavy-hydrocarbon-catalyst slurry; --.
" 6, " 38, "60" should be -- 60 Angstrom units (A) --.
" 7, " 20, "or spheres" should be -- of spheres --.
" 8, " 13, "source 26" should be -- from source 26 --.
" 10, " 66, "caolescer" should be -- coalescer --.
" 11, " 33, "Stream" should be -- Steam --.
" 11, " 36, "Lights" should be -- Light --.
" 18, " 25, "4" should be -- 5 --.

Signed and Sealed this

Eighth Day of March 1977

[SEAL]

Attest:

RUTH C. MASON
Attesting Officer

C. MARSHALL DANN
Commissioner of Patents and Trademarks